US011342603B2

(12) United States Patent
Tomai et al.

(10) Patent No.: US 11,342,603 B2
(45) Date of Patent: May 24, 2022

(54) THERMAL MANAGEMENT OF TRACTION BATTERY BASED ON ELECTRIC CURRENT OF TRACTION BATTERY

(71) Applicant: Ford Global Technologies, LLC, Dearborn, MI (US)

(72) Inventors: Matthew Allen Tomai, Clawson, MI (US); Zachary March, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 15/871,262

(22) Filed: Jan. 15, 2018

(65) Prior Publication Data

US 2019/0221899 A1 Jul. 18, 2019

(51) Int. Cl.
| H01M 10/613 | (2014.01) |
| H01M 10/625 | (2014.01) |
| H01M 10/6568 | (2014.01) |
| H01M 10/63 | (2014.01) |
| B60L 50/60 | (2019.01) |
| B60L 58/25 | (2019.01) |

(52) U.S. Cl.
CPC ........... *H01M 10/613* (2015.04); *B60L 50/66* (2019.02); *B60L 58/25* (2019.02); *H01M 10/625* (2015.04); *H01M 10/63* (2015.04); *H01M 10/6568* (2015.04); *H01M 2220/20* (2013.01)

(58) Field of Classification Search
CPC ........ H01M 10/613; B60L 50/66; B60L 58/25
USPC .................................................. 429/62, 120
See application file for complete search history.

(56) References Cited

U.S. PATENT DOCUMENTS

| 5,844,399 | A | 12/1998 | Stuart | |
|---|---|---|---|---|
| 9,531,042 | B2 | 12/2016 | Buford | |
| 2009/0249807 | A1* | 10/2009 | Nemesh | B60H 1/00278 62/117 |
| 2015/0211412 | A1* | 7/2015 | Presetschnik | H01M 10/6569 123/41.1 |
| 2015/0217623 | A1* | 8/2015 | Hatakeyama | B60L 1/003 165/42 |
| 2015/0280294 | A1* | 10/2015 | Shin | H01M 10/625 429/50 |
| 2015/0291055 | A1 | 10/2015 | He | |
| 2016/0124052 | A1 | 5/2016 | Inguva et al. | |

(Continued)

FOREIGN PATENT DOCUMENTS

| FR | 2968842 A1 | 6/2012 |
| JP | 2005063682 A * | 3/2005 |

OTHER PUBLICATIONS

Schaschke, Carl, "chemical reaction equilibrium" to "Christmas tree," Dictionary of Chemical Engineering, 2013, Oxford University Press (Year: 2013).*

(Continued)

*Primary Examiner* — Sean P Cullen
(74) *Attorney, Agent, or Firm* — David B Kelley; Brooks Kushman P.C.

(57) ABSTRACT

A vehicle includes a traction battery and a battery cooling system arranged to cool the battery. A controller of the vehicle is programmed to, responsive to current of the battery exceeding a current threshold and a temperature of the battery being less than a threshold temperature, activate the battery cooling system to cool the battery.

17 Claims, 4 Drawing Sheets

(56) References Cited

U.S. PATENT DOCUMENTS

2018/0001784 A1\* 1/2018 Porras .................... B60L 58/26
2018/0006347 A1\* 1/2018 Porras ................ H01M 10/617

OTHER PUBLICATIONS

Butterfield et al., "channel capacity" to "chip-enable," Dictionary of Electronics and Electrical Engineering, 2018, Oxford University Press (Year: 2018).\*

Atkins et al., "characteristic equation" to "chordal thickness," Dictionary of Mechanical Engineering, 2013, Oxford University Press (Year: 2013).\*

\* cited by examiner

| Battery Temp (degC) | Chiller Capacity (%) | | | | | |
|---|---|---|---|---|---|---|
| | 100 | 80 | 60 | 40 | 20 | 0 |
| -30 | 450 | 427.5 | 405 | 382.5 | 360 | 337.5 |
| -20 | 400 | 380 | 360 | 340 | 320 | 300 |
| -10 | 350 | 332.5 | 315 | 297.5 | 280 | 262.5 |
| 0 | 300 | 285 | 270 | 255 | 240 | 225 |
| 10 | 250 | 237.5 | 225 | 212.5 | 200 | 187.5 |
| 20 | 200 | 190 | 180 | 170 | 160 | 150 |
| 30 | 150 | 142.5 | 135 | 127.5 | 120 | 112.5 |
| 40 | 50 | 47.5 | 45 | 42.5 | 40 | 37.5 |
| 50 | 0 | 0 | 0 | 0 | 0 | 0 |
| 60 | 0 | 0 | 0 | 0 | 0 | 0 |

| Battery Temp | Chiller Capacity (%) | | | | | |
|---|---|---|---|---|---|---|
| | 100 | 80 | 60 | 40 | 20 | 0 |
| -30 | 25 | 23.75 | 22.5 | 21.25 | 20 | 18.75 |
| -20 | 20 | 19 | 18 | 17 | 16 | 15 |
| -10 | 15 | 14.25 | 13.5 | 12.75 | 12 | 11.25 |
| 0 | 14 | 13.3 | 12.6 | 11.9 | 11.2 | 10.5 |
| 10 | 12 | 11.4 | 10.8 | 10.2 | 9.6 | 9 |
| 20 | 10 | 9.5 | 9 | 8.5 | 8 | 7.5 |
| 30 | 8 | 7.6 | 7.2 | 6.8 | 6.4 | 6 |
| 40 | 1 | 0.95 | 0.9 | 0.85 | 0.8 | 0.75 |
| 50 | 0 | 0 | 0 | 0 | 0 | 0 |
| 60 | 0 | 0 | 0 | 0 | 0 | 0 |

THERMAL MANAGEMENT OF TRACTION BATTERY BASED ON ELECTRIC CURRENT OF TRACTION BATTERY

TECHNICAL FIELD

The present disclosure relates to a control strategy and method for operating a chiller of a battery-coolant system, and more specifically to controls and methods that anticipate temperature increases in the battery and proactively cool the battery based on the anticipated temperature increase.

BACKGROUND

The need to reduce fuel consumption and emissions in automobiles and other vehicles is well known. Vehicles are being developed that reduce, or completely eliminate, reliance on internal-combustion engines. Electric and hybrid vehicles are one type of vehicle currently being developed for this purpose. Electric and hybrid vehicles include a traction motor that is powered by a traction battery. The traction battery requires a thermal-management system to thermally regulate the temperate of the battery cells.

SUMMARY

According to one embodiment, a vehicle includes a traction battery and a battery cooling system arranged to cool the battery. A controller of the vehicle is programmed to, responsive to current of the battery exceeding a current threshold and a temperature of the battery being less than a threshold temperature, activate the battery cooling system to cool the battery.

According to another embodiment, a vehicle includes a traction battery and a refrigerant system including a compressor, a condenser, a battery chiller, and a cabin evaporator. The vehicle further includes a coolant system having conduit arranged to circulate coolant through the chiller and the battery. A controller is programmed to, responsive to current of the battery exceeding a threshold, activate the battery chiller to cool the battery.

According to yet another embodiment, a method of controlling a thermal-management system of a traction battery in fluid communication with a chiller is presented. The method includes circulating refrigerant and coolant through the chiller in response to the coolant being below a threshold temperature and current of the traction battery exceeding an electric-current threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
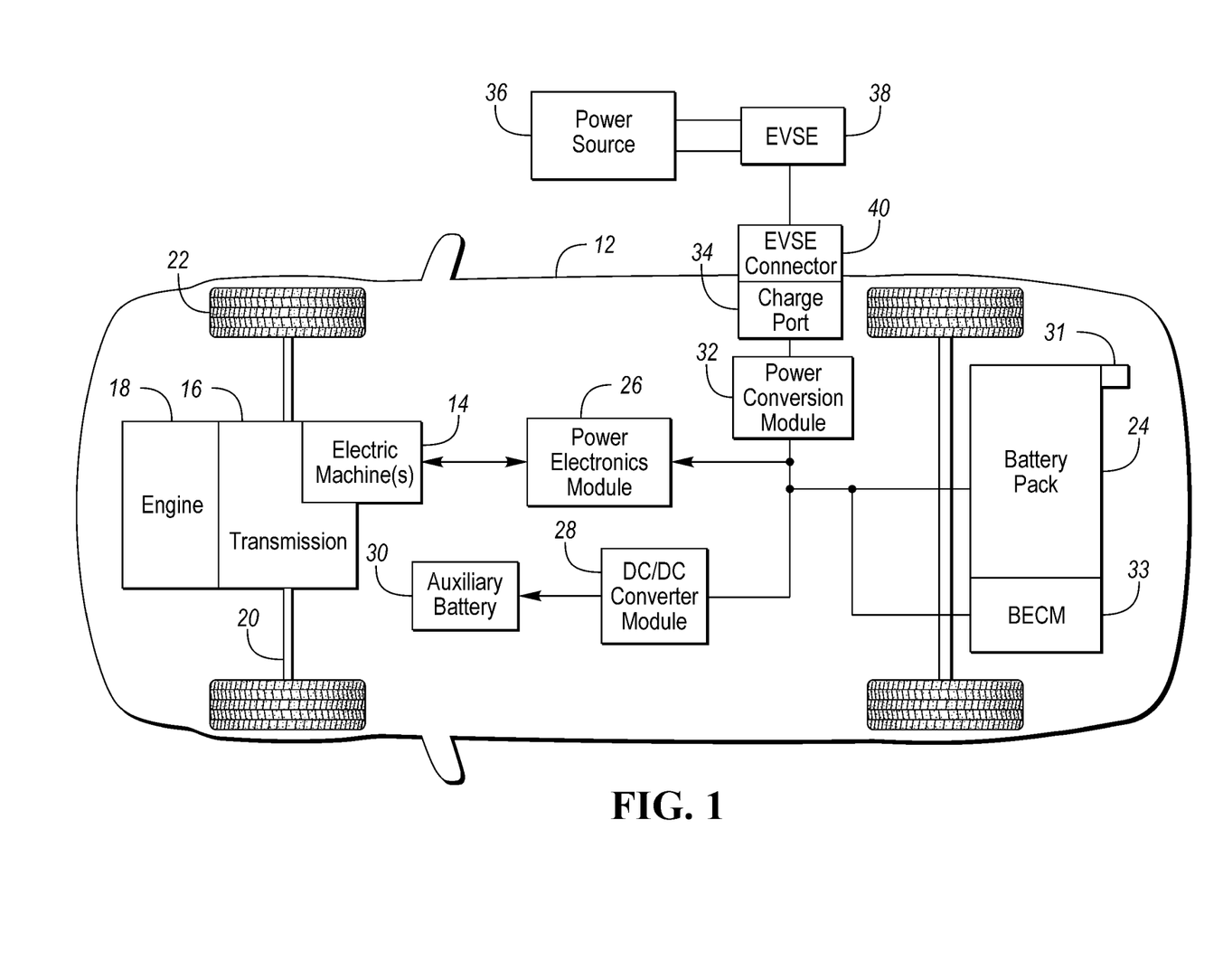
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully electric vehicle. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers.

The traction battery 24 and other vehicle component are thermally regulated with one or more thermal-management systems. Example thermal-management systems are shown in the figures and described below.

Figure 2:
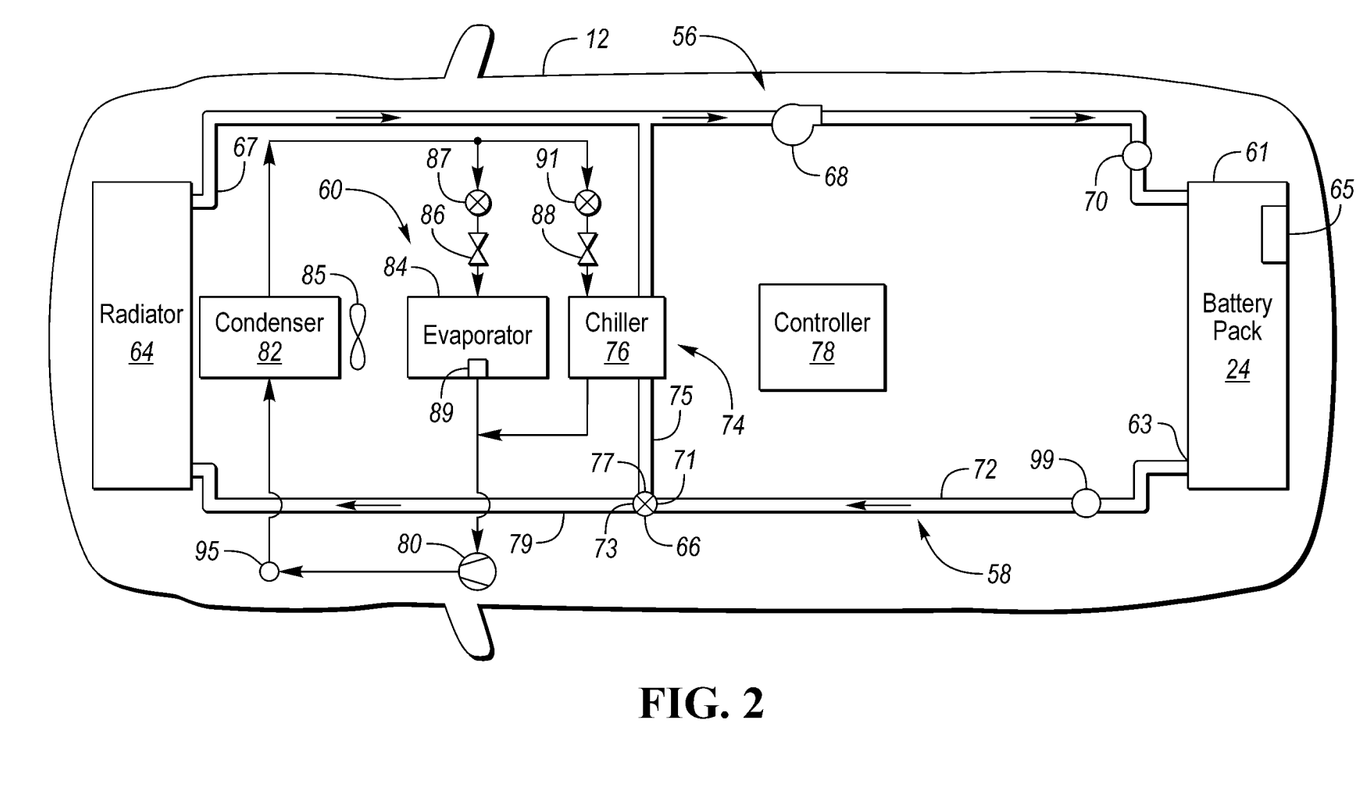
FIG. 2 is a schematic diagram of a battery thermal-management system and a climate control-system of a vehicle.

Referring to FIG. 2, the vehicle 12 includes a thermal-management system 56. The thermal-management system 56 can be employed to manage thermal loads generated by various vehicle components, such as the battery assembly 24, powertrain components, and power-electronic components. For example, the thermal-management system 56 can selectively circulate coolant to the battery assembly 24 to either cool or heat the battery assembly depending on operating conditions.

The thermal-management system 56 may include one or more vehicle controllers 78. While schematically shown as a single module in the illustrated embodiment, the controller 78 may be part of a larger control system and may be controlled by various other controllers throughout the vehicle, such as a vehicle-system controller (VSC) that includes a powertrain control unit, a transmission control unit, an engine control unit, a BECM, etc. It should be understood that the controller 78 and one or more other controllers can collectively be referred to as "a controller" that controls, such as through a plurality of integrated algorithms, various actuators in response to signals from various sensors to control functions associated with the vehicle, and in this case, with a thermal-management system 56. The various controllers that make up the VSC can communicate with one another using a common bus protocol, e.g., CAN.

In one embodiment, the battery thermal-management system 56 includes a coolant subsystem 58 and a refrigerant subsystem 60. These two loops may operate in tandem or independently of each other depending upon the battery cooling requirements, the ambient-air temperature, the cabin load, and other factors. The refrigerant subsystem 60 may be a vapor-compression heat pump that circulates a refrigerant transferring thermal energy to various components of the climate-control system. The refrigerant subsystem 60 may be the air-conditioning (AC) system for the cabin. Utilizing the cabin AC may be more cost effective than having a dedicated refrigerant system for the traction battery 24. The coolant subsystem 58 (coolant loop) circulates coolant to the battery assembly 24. The coolant may be a conventional type of coolant mixture, such as water mixed with ethylene glycol. Other coolants could also be used by the coolant subsystem 58. The coolant subsystem 58 may include a radiator 64, a proportioning valve 66, a pump 68, an inlet coolant temperature sensor 70, the battery 24, an outlet coolant temperature sensor 99 and a chiller 76. The coolant subsystem 58 may also include additional components. In some embodiments, the radiator and associated components may be omitted.

In operation, warm coolant exits an outlet 63 of the battery 24. The warm coolant is circulated to the radiator 64 via line 72 when the valve 66 is in a first set of positions. The warm coolant is cooled within the radiator 64 by airflow traveling across the fins to effectuate heat transfer between the airflow and the warm coolant. Cool coolant exits the radiator 64 and enters line 67 for recirculation to the pump 68. The radiator 64 and at least a portion of lines 67 and 79 may be referred to as the radiator loop.

The sensor 70 may be positioned near an inlet 61 of the battery pack 24. The sensor 70 is configured to monitor the temperature of the coolant that is returned to the battery pack 24. In some embodiments, multiple sensors may be used to measure coolant temperature at various locations. The battery pack 24 may also include one more sensors 65. The sensors 65 monitor the temperatures of various battery cells (not shown) of the battery pack 24.

The coolant subsystem 58 includes a chiller loop 74 including a line 75 connected between line 72 and line 67. The line 75 fa second segment of conduit) allows coolant to bypass the radiator 64, and instead, circulate through the Chiller 76. The valve 66 controls the circulation of coolant through the chiller 76 and the radiator 64. The valve 66 may be a solenoid valve that is electrically controlled by the controller 78. The valve 66 may include a stepper motor for increasing or decreasing the opening of the valve. Other types of valves could alternatively be utilized within the coolant subsystem 58. The valve 66 includes an inlet 71 connected to line 72, a first outlet 73 connected to line 79 (a first segment of conduit), and a second outlet 77 connected to line 75. The valve 66 is configured such that each of the outlets 73, 77 selectively receive a proportion, between 0 and 100 percent, inclusive, of the coolant flowing through the valve 66 depending upon a position of the valve. By adjusting the proportion of coolant split between the outlets, the amount of coolant flowing through the chiller 76 and the radiator 64 can be controller according to algorithms stored in memory of the controller 78.

The chiller 76 exchanges heat with the refrigerant subsystem 60 to provide a chilled coolant during certain conditions. A portion of the warm coolant from the battery pack 24 may enter the chiller line 75 and exchange heat with a refrigerant of the refrigerant subsystem 60 within the chiller 76 to dissipate heat.

The battery chiller 76 may have any suitable configuration. For example, the chiller 76 may have a plate-fin, tube-fin, or tube-and-shell configuration that facilitates the transfer of thermal energy without mixing the heat-transfer fluids in the coolant subsystem 58 and the refrigerant subsystem 60.

The refrigerant subsystem 60, may include a compressor 80, a condenser 82, at least one cabin evaporator 84, the chiller 76, a first expansion device 86, a shutoff valve 87, a second expansion device 88, and a second shutoff valve 91. The compressor 80 pressurizes and circulates the refrigerant through the refrigerant subsystem 60. The compressor 80 may be powered by an electrical or non-electrical power source. A pressure sensor 95 may monitor the pressure of the refrigerant exiting the compressor 80.

The refrigerant exiting the compressor 80 may be circulated to the condenser 82 by one or more conduits. The condenser 82 transfers heat to the surrounding environment by condensing the refrigerant from a vapor to a liquid. A fan 85 may be selectively actuated to circulate airflow across the condenser 82 to further effectuate heat transfer between the refrigerant and the airflow. The fan 85 may be arranged to circulate air over the radiator 64 as well.

At least a portion of the liquid refrigerant that exits the condenser 82 may be circulated through the first expansion device 86 (depending upon the position of valve 87) and then to the evaporator 84. The first expansion device 86 is adapted to change the pressure of the refrigerant. In one embodiment, the first expansion device 86 is an electronically controlled expansion valve (EXV). In another embodiment, the first expansion device 86 is a thermal expansion valve (TXV). If the expansion device is an EXV, the shutoff valve 87 can be omitted. The liquid refrigerant is vaporized from liquid to gas, while absorbing heat, within the evaporator 84. The gaseous refrigerant may then return to the compressor 80. The refrigerant subsystem may include an evaporator temperature sensor 89 that is electrically connected to the controller 78. The sensor 89 outputs a signal indicative of the evaporator temperature. The controller 78 may operate the system based on signals received from sensor 89. Alternatively, the valve 87 may be closed to bypass the evaporator 84.

Another portion of the liquid refrigerant exiting the condenser 82 (or all of the refrigerant if the valve 87 is closed) may circulate through the second expansion device 88 and enter the chiller 76 if the valve 91 is open. The second expansion device 88, which may also be an EXV or TXV, is adapted to change the pressure of the refrigerant. The refrigerant exchanges heat with the coolant within the chiller 76 to provide chilled coolant to the battery 24 during a chiller mode.

Typical battery-cooling systems wait to cool the battery until the battery exceeds a threshold temperate, at which point, the battery chiller, battery radiator, or other cooling device is activated. This strategy would be fine if the battery-cooling system had limitless capacity. But, battery-cooling systems have a maximum capacity and in many instances the battery cooling system is a shared system that is also responsible for cooling the cabin.

In systems in which the battery chiller is in fluid communication with the cabin AC system, as is the case in the illustrated embodiment, a potential for negatively affecting the temperature of the cabin air is possible if the AC system does not have enough capacity to cool both the cabin and the battery at their respective loads. For example, on a hot day, simultaneously cooling the battery and the passenger cabin via the AC system may cause the outlet temperature of the cabin evaporator 84 to increase beyond a target temperature, which causes the air blowing into the cabin to be warmer than that requested by the occupants. The occupants may find it dissatisfying when the cabin temperature is not conforming with the demanded temperature. On the other hand, the battery cannot be operated, at least for an extended period of time, above a maximum temperature without risking damage to the battery. Thus, many system designers must make a priority choice between battery cooling and cabin cooling. Some designers chose to cool the cabin as requested and power limit the battery as needed, others chose to cool the battery to avoid power limiting and allow the cabin temperature to rise.

Having to choose priority between the cabin and the battery is not an ideal situation and may be avoided, or at least delayed, by anticipating future battery temperature and proactively cooling the battery before the battery-temperature threshold is met. For example, the battery may be proactively cooled to prolong the battery from reaching the battery-temperature threshold. The following Figures and related text describe example controls and methods for proactively cooling the battery based on battery current. Battery temperature is related to battery current, thus, battery current is a good indicator of future battery temperature.

Figure 3:
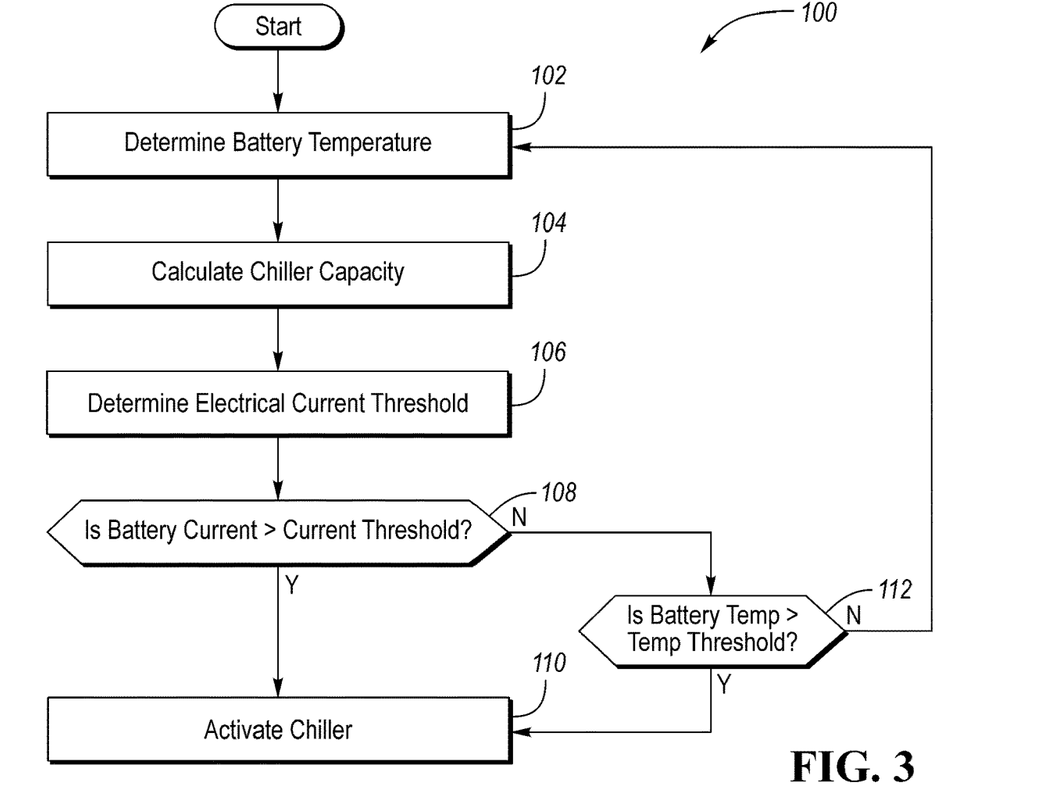
FIG. 3 is a flow chart for operating a battery chiller.
Figure 4:
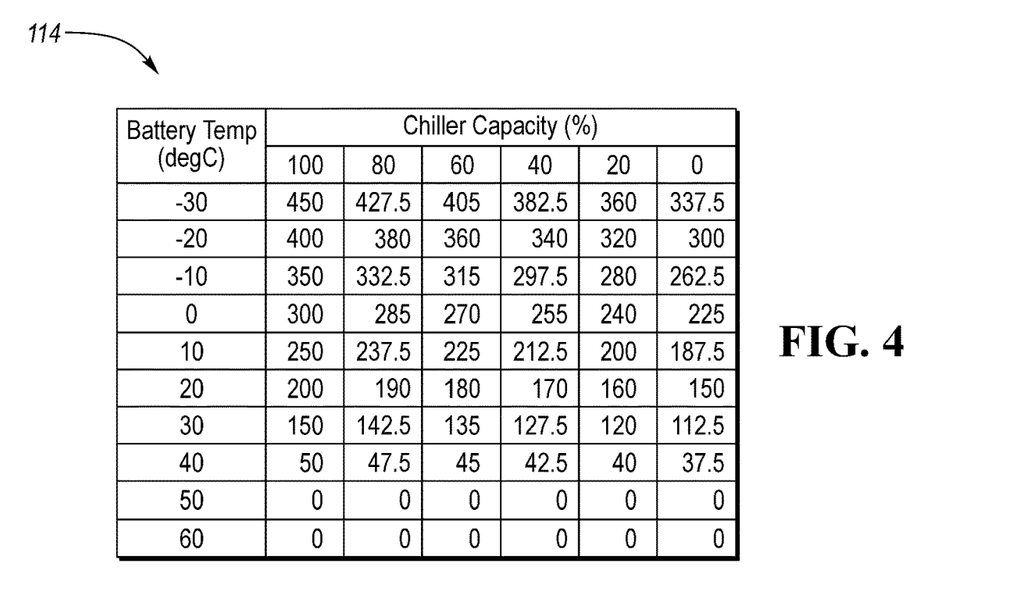
FIG. 4 is a table of electric-current thresholds.

Referring to FIGS. 3 and 4, a flow chart 100 illustrates an algorithm for activating the battery chiller. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted, Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle controller, such as controller 78. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

At operation 102, the controller determines the temperature of the traction-battery assembly. The battery assembly may include one or more temperature sensors configured to measure temperature of individual cells of the battery assembly and output a signal to the controller indicative of the cell temperature. The controller may include logic for determining an average temperature for the battery assembly based on these one or more sensors. The temperature of the battery assembly could also be inferred based on temperature of the coolant exiting the battery assembly. For example, the controller may use a signal received from sensor 99 to infer battery temperature.

At operation 104, the controller calculates capacity of the chiller. The controller is configured to determine a total capacity of the AC system, the amount of the total capacity being used by the cabin evaporator (which may be called evaporator capacity or cabin load), and a chiller capacity that is available to the chiller if needed. The chiller capacity is the reserve capacity of the refrigerant system to accept additional heat from the chiller. The chiller capacity is equal to the total system capacity minus the evaporator capacity.

At operation 106, the controller determines a value of an electrical-current threshold at an instant time based on the battery temperature and the chiller capacity at that instant time. Amps may be the units of the electrical-current threshold. FIG. 4 illustrates an example table 114 of current thresholds. The table 114 may be stored in memory of the controller. The current threshold decreases as the temperature of the battery increases, and the current threshold decreases as chiller capacity decreases.

At operation 108, the battery current is compared to the current threshold of operation 106. If the battery current exceeds the current threshold, control passes to operation 110 and the chiller is activated. The chiller may be activated by energizing the refrigerant system and the battery-cooling system, if OFF, and controlling one or more valves to circulate refrigerant through one side of the chiller and coolant through the other side of the chiller to transfer thermal energy from the coolant to the refrigerant effectuating battery coolant. In the illustrated embodiment, valve 91 blocks refrigerant from the chiller when in a first position (OFF) and allows refrigerant to the chiller when in a second position (ON). The controller 78 may command valve 91 to the ON position at operation 110. The battery current may be filtered. For example, the battery current may be an average current for a given window of time. The battery current may be an $I_{RMS}$ value.

If the battery current is less than the current threshold at operation 108, control passes to operation 112 and the battery temperature is compared to a battery-temperature threshold. If the battery temperature is greater than the temperature threshold, control passes to operation 110 and the chiller is activated.

Figure 5:
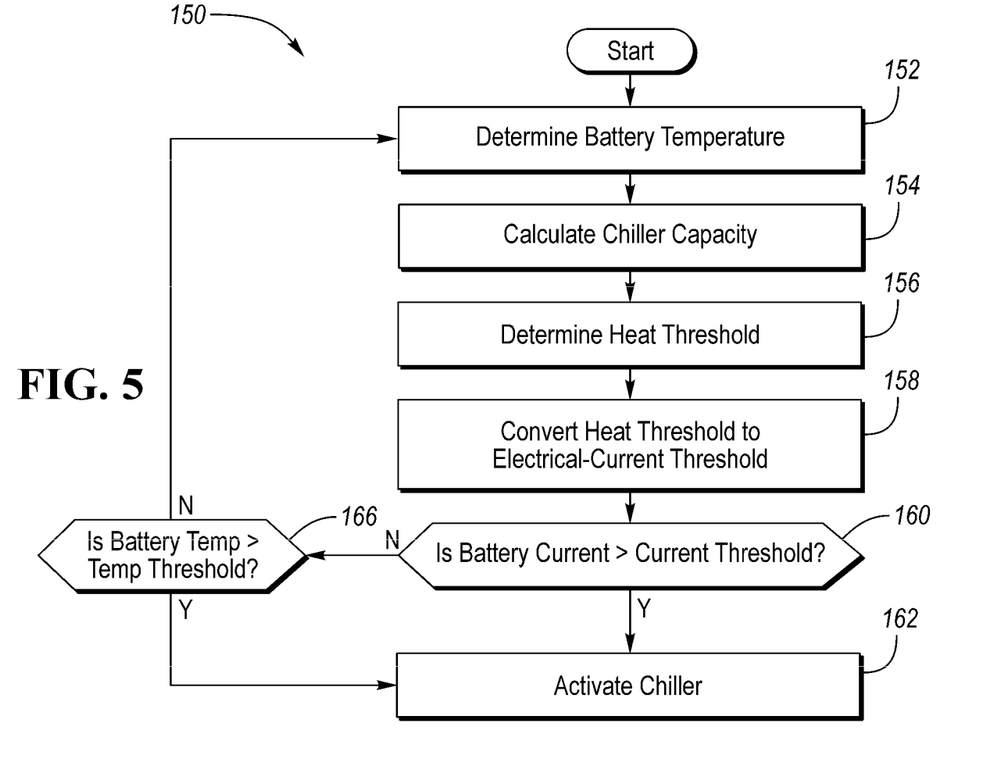
FIG. 5 is another flow chart for operating a battery chiller.
Figure 6:
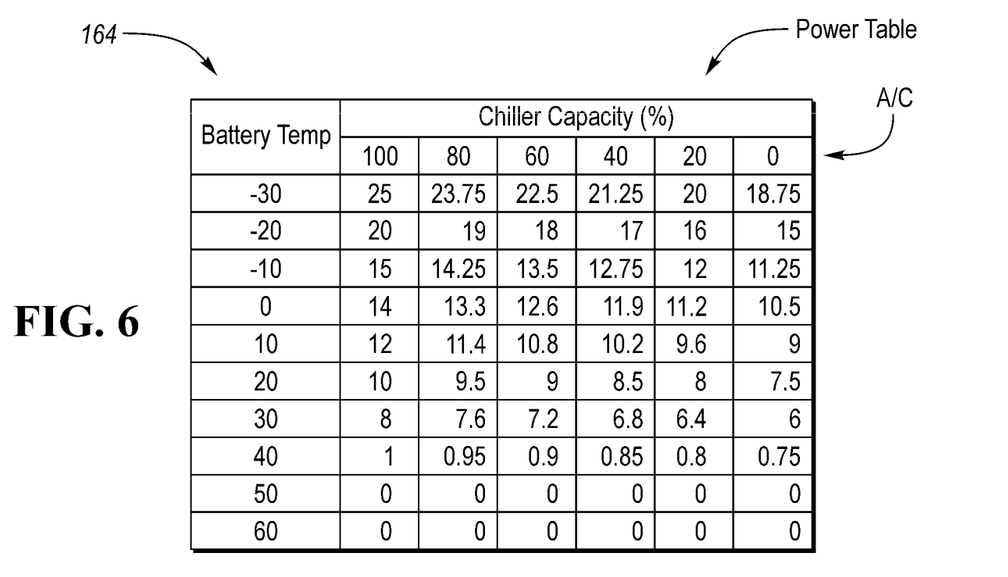
FIG. 6 is a table of battery-heat thresholds.

Referring to FIGS. 5 and 6, a flow chart 150 illustrates an algorithm for activating the battery chiller according to another embodiment. At operation 152, the controller determines the temperature of the traction-battery assembly. At operation 154, the controller calculates capacity of the chiller.

At operation 156, the controller determines a value of a battery-heat threshold at an instant time based on the battery temperature and the chiller capacity at that instant time. The heat threshold may be a value of power having units or Watts or Kilowatts. FIG. 6 illustrates an example table 164 of battery-heat thresholds. The table 164 may be stored in memory of the controller. The heat threshold decreases as the temperature of the battery increases, and the heat threshold decreases as chiller capacity decreases. At operation 158, the controller converts the heat threshold of operation 156 to an electrical-current threshold. This may be done by dividing the battery-heat threshold by a resistance of the battery, and then determining an average current using the root-mean-square method or other known methods.

At operation 160, the battery current is compared to the current threshold of operation 158. If the battery current exceeds the current threshold, control passes to operation 162 and the chiller is activated. If the battery current is less than the current threshold at operation 160, control passes to operation 166 and the battery temperature is compared to a battery-temperature threshold. If the battery temperature is greater than the temperature threshold, control passes to operation 162 and the chiller is activated.

The concept of using battery current to operate a battery thermal-management system is not limited to operation of the chiller. Operation of radiator cooling of the battery 24 may also use battery current as a parameter. The vehicle 12 may be programmed with a cooling table (similar to FIGS. 4 and 6) associated with radiator cooling. The table includes values of electrical-current thresholds based on the battery temperature and cooling capacity of the battery cooling system. Valves, pumps, and the like may be actuated in response to battery current exceeding the electrical-current threshold to effectuate a desired amount of radiator cooling of the battery.

This disclosure is also not limited to the illustrated thermal management system in which that battery is liquid cooled by a chiller or a radiator. In an alternative embodiment, the battery may be air cooled. The air-cooled system may include at least one fan, air ducts, and a controller. The fan is energized to circulate an airstream through the battery to cool or heat the battery cells. Battery current may be a parameter used to operate the air-cooled system. For example, the fan may be energized in response to battery current being below a battery current threshold. The air-cooled system may have one or more associated cooling tables similar to the tables of FIGS. 4 and 6. The cooling table include values of electrical-current thresholds based on the battery temperature and cooling capacity of the air-cooled system.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery;
    a refrigerant system including a compressor, a condenser, a battery chiller, and a cabin evaporator;
    a coolant system including conduit arranged to circulate coolant through the chiller and the battery; and
    a controller programmed to, responsive to current of the traction battery exceeding a threshold, activate the battery chiller to cool the battery, wherein the threshold is based on capacity of the chiller.

2. The vehicle of claim 1, wherein the capacity of the chiller is based on a load of the cabin evaporator.

3. The vehicle of claim 1, wherein the threshold is based on electrical resistance of the battery.

4. The vehicle of claim 1, wherein the refrigerant system further includes a valve configured to circulate refrigerant to the chiller when in a first position and to block refrigerant to the chiller when in a second position, wherein the chiller is activated by placing the valve in the first position.

5. A vehicle comprising:
    a traction battery;
    an air-conditioning system including a condenser, a cabin evaporator, and a chiller;
    a liquid coolant system including a radiator, a valve, and conduit configured to convey liquid coolant through the radiator, the valve, the traction battery, and the chiller, wherein the valve is configured to proportion the coolant between the radiator and the chiller and includes a first position in which at least a portion of the coolant is routed to the chiller and a second position in which 100 percent of the coolant is routed to the radiator; and
    a controller programmed to:
        determine a temperature of the traction battery,
        calculate a capacity of the chiller by subtracting a cabin load of the cabin evaporator from a total capacity of the air-conditioning system,
        determine an electric-current threshold based on the temperature and the chiller capacity, and
        responsive to current of the traction battery exceeding the electric-current threshold and the temperature being less than a threshold temperature, command the valve to the first position to circulate the least a portion of the coolant through the chiller to transfer thermal energy from the traction battery to the air-conditioning system.

6. The vehicle of claim 5, wherein the electric-current threshold decreases as the temperature of the traction battery increases.

7. The vehicle of claim 5, wherein the liquid coolant system further includes a temperature sensor configured to measure temperature of the coolant, and the temperature of the traction battery is determined based on signals from the sensor.

8. The vehicle of claim 5, wherein the electric-current threshold decreases as the chiller capacity decreases.

9. The vehicle of claim 7, wherein the electric-current threshold increases as the chiller capacity increases.

10. The vehicle of claim 5, wherein the electric-current threshold is further based on electrical resistance of the traction battery.

11. The vehicle of claim 1, wherein the controller is programmed to activate the battery chiller further in response to a temperature of the battery exceeding a threshold temperature.

12. The vehicle of claim 1, wherein the threshold is based on temperature of the battery.

13. The vehicle of claim 5, wherein the conduit includes a first segment connecting a first outlet of the valve to the radiator and a second segment connecting a second outlet of the valve to the chiller.

14. The vehicle of claim 5, wherein the traction battery includes a sensor, and the temperature of the traction battery is determined based signals from the sensor.

15. The vehicle of claim 5, wherein the air-conditioning system further includes a first expansion device disposed between the condenser and the cabin evaporator, and a second expansion device disposed between the condenser and the chiller.

16. A method of controlling a thermal-management system of a traction battery in fluid communication with a chiller, the method comprising:
    determining a temperature of the traction battery;
    determining an evaporator capacity;
    calculating a chiller capacity by subtracting the evaporator capacity from a total capacity of an air conditioning system associated with the thermal-management system;
    determining an electric-current threshold based on the temperature and the chiller capacity; and
    circulating refrigerant and coolant through the chiller in response to the temperature of the traction battery being below a threshold temperature and current of the traction battery exceeding the electric-current threshold.

17. The method of claim 16 further comprising circulating the refrigerant and the coolant through the chiller in response to the temperature of the traction battery exceeding the threshold temperature and the current of the traction battery being less than the electric-current threshold.

* * * * *